United States Patent [19]

Suzuki et al.

[11] 4,062,689

[45] Dec. 13, 1977

[54] GLASS COMPOSITION WHICH IS RESISTANT TO ALKALI

[75] Inventors: Yoshiro Suzuki, Tokyo; Hironori Ohta; Masuo Shirasaka, both of Yokohama, all of Japan

[73] Assignee: Asahi Glass Company Ltd., Tokyo, Japan

[21] Appl. No.: 672,541

[22] Filed: Apr. 1, 1976

[30] Foreign Application Priority Data

Apr. 11, 1975 Japan .................... 50-43323
Apr. 11, 1975 Japan .................... 50-43324

[51] Int. Cl.² .................... C03C 3/04; C03C 13/00; C04B 31/06
[52] U.S. Cl. .................... 106/50; 106/52; 106/99
[58] Field of Search .................... 106/50, 52, 99; 65/134

[56] References Cited

U.S. PATENT DOCUMENTS

| 3,375,095 | 3/1968 | Poole | 65/134 |
|---|---|---|---|
| 3,511,629 | 5/1970 | Bauer et al. | 65/134 |
| 3,615,767 | 10/1971 | Conroy et al. | 106/52 |
| 3,783,092 | 1/1974 | Majumdar | 106/52 |
| 3,833,388 | 9/1974 | Ohlberg et al. | 65/134 |
| 3,846,143 | 11/1974 | Mod et al. | 65/134 |
| 3,861,926 | 1/1975 | Silan et al. | 106/52 |
| 3,861,927 | 1/1975 | Kimura et al. | 106/52 |
| 3,904,424 | 9/1975 | Aoki et al. | 106/52 |
| 3,928,049 | 12/1975 | Otourma et al. | 106/52 |
| 4,002,482 | 1/1977 | Coenen | 156/50 |

FOREIGN PATENT DOCUMENTS

| 289,997 | 10/1971 | U.S.S.R. | 106/52 |
|---|---|---|---|
| 455,072 | 3/1975 | U.S.S.R. | 106/50 |

*Primary Examiner*—Winston A. Douglas
*Assistant Examiner*—Mark Bell
*Attorney, Agent, or Firm*—Oblon, Fisher, Spivak, McClelland & Maier

[57] ABSTRACT

A glass composition which possesses a chemical resistance. The glass composition consists essentially of $SiO_2$: 45 – 65 wt.%
$ZrO_2$: 10 – 20 wt.%
$Cr_2O_3$: 0 – 5 wt.%
$SnO_2$: 0 – 5 wt.%
RO: 0 – 18 wt.%
$R'_2O$: 0 – 18 wt.%
$SO_3$: 0.05 – 1 wt.% wherein the sum of contents of $Cr_2O_3 + SnO_2$ is 0.5 – 10 wt.%; the sum of contents of $ZrO_2 + SnO_2 + Cr_2O_3$ is 12 – 25 wt.%; RO is selected from the group consisting of CaO, MgO, ZnO, BaO, and SrO; and $R'_2O$ is selected from the group consisting of $K_2O$ of 0 – 5 wt.%, $Na_2O$ of 0 – 18 wt.% and $Li_2O$ of 0 – 5 wt.%.

6 Claims, No Drawings

GLASS COMPOSITION WHICH IS RESISTANT TO ALKALI

BACKGROUND OF THE INVENTION

1. Field of the Invention

The present invention relates to a glass composition which has alkali-resistance.

2. Description of the Prior Art

It has been proposed to prepare glass compositions which have excellent chemical resistance, especially alkali-resistance and acid-resistance.

Quartz glass and high silica glass have excellent chemical resistance and heat resistance, however, they have the disadvantages of possessing high liquidus temperatures and complicated processes for fabrication.

High silica borosilicate glass and aluminosilicate glass have excellent chemical resistance and have relatively good fabricatability and have been practically used.

However, since they have high silica content or high alumina content, the liquidus temperature is too high, and the total melting time is too long and the fabricatability is not good.

It is known that $ZrO_2$, $La_2O_3$, $TiO_2$ and the like are effective components for the glass compositions which are suitable for glass fibers where alkali-resistance is important. Glass compositions including these special components have been developed. However, they have the disadvantages of the inferior melting characteristic of easily devitrifying.

Glass compositions having excellent alkali-resistance and high fibricatability such as fiber formation, are not known. Studies have been conducted to prepare glass compositions having low zirconia content and improved melting characteristics by adding other components such as $TiO_2$, $Cr_2O_3$, $MnO_2$, $Al_2O_3$ and the like. However, these do not have the desired chemical resistance especially alkali-resistance.

Glass compositions having high alkali-resistance, which are suitable for glass fibers are disclosed in B.P. 1,290,528 (U.S. Pat. No. 3,861,926); these glass fibers have high $ZrO_2$ content and are used for reinforcement of cementitious products.

SUMMARY OF THE INVENTION

It is an object of the present invention to provide a glass composition which has high alkali-resistance and excellent melting characteristics. It is another object of the invention to provide a glass fiber having high alkali-resistance which is used for reinforcing cementitious product. It is the other object of the invention to provide a Portland cement product reinforced by glass fibers having high alkali-resistance. These objects of the invention can be attained by glass whose composition consists essentially of $SiO_2$:45–65 wt.%
$ZrO_2$:10–20 wt.%
$Cr_2O_3$:0–5 wt.%
$SnO_2$:0–5 wt.%
RO:0–18 wt.%
$R'_2O$:0–18 wt.%
$SO_3$:0.05–1 wt.%.

wherein the sum of contents $Cr_2O_3 + SnO_2$ is 0.5–10 wt.%; the sum of contents $ZrO_2 + SnO_2 + Cr_2O_3$ is 12–25 wt.% ; RO is selected from the group consisting of CaO, MgO, ZnO, BaO and SrO; and $R'_2O$ is selected from the group consisting of $K_2O$ of 0–5 wt.%, $Na_2O$ of 0–18 wt.% and $Li_2O$ of 0–5 wt.%.

The preferred glass composition consists essentially of $SiO_2$:45–65 wt.%
$ZrO_2$:10–20 wt.%
$Cr_2O_3$:0–5 wt.%
$SnO_2$:0.5–5 wt.%
RO:0–15 wt.%
$R'_2O$:5–18 wt.%;
$SO_3$: 0.05–1 wt.%.

wherein the sum of contents of $ZrO_2 + SnO_2 + Cr_2O_3$ is 12–25 wt.%, RO is selected from the group consisting of CaO, MgO, ZnO, BaO and SrO; and $R'_2O$ is selected from the group consisting of $K_2O$ of 0–3 wt.%, $Na_2O$ of 5–18 wt.% and $Li_2O$ of 0–3 wt.%.

The more preferred glass composition consists essentially of $SiO_2$:45–65 wt.%
$ZrO_2$:10–20 wt.%
$Cr_2O_3$:0.5–5 wt.%
$SnO_2$:0.5–5 wt.%
RO:5–15 wt.%
$R'_2O$:5–15 wt.%
$SO_3$:0.05–1 wt.%..

wherein the sum of contents of $ZrO_2 + SnO_2 + Cr_2O_3$ is 12–25 wt.%; RO is selected from the group consisting of CaO, MgO, ZnO, BaO and SrO; and $R'_2O$ is selected from the group consisting of 0–3 wt.% of $K_2O$, 5–15 wt.% of $Na_2O$ and 0–3 wt.% of $Li_2O$.

DETAILED DESCRIPTION OF THE PREFERRED EMBODIMENTS

The glass compositions of the invention have high alkali-resistance; excellent melting characteristics and do not substantially undergo devitrification; have excellent moldability and fabricatability and can be used not only for glass fibers, glass rods and glass tubes but also various glass instruments in physics and chemistry.

The glass compositions can be used for glass fibers and various containers because even though the alkali content is high the water resistance is relatively high as well, the amount of alkali which elutes is so small that deterioration caused by decreasing alkali content is not found for long period of time. The glass compositions of the invention can be continuously spun to prepare glass fibers, especially continuous filaments, whereby the glass compositions are especially useful to prepare glass fibers for reinforcing cementitious products, such as concretes.

One embodiment of the manufacture of glass fibers made of the glass composition will be illustrated.

Raw materials are weighed, mixed and fed into a melter which is heated by a heavy oil burner, a gas burner, an electric heater or the like, whereby the mixture is melted. The molten glass composition is gradually moves into the refining chamber and is fed to a feeder having many orifices (platina alloy bushing) from which glass fibers are meltspun, cooled and bonded while applying a sizing agent and taken up on a creel.

When a glass rod is prepared, a feeder having an orifice is used and a molten glass rod extruded from the orifice is bent to the horizontal direction while heating; is gradually cooled and then cut to the desired length.

Alternatively the molten glass rod extruded from the orifice is fed onto a rotary sleeve with heating and, if necessary, injecting air to the rotary sleeve to take out the glass rod or tube which is bent to the horizontal direction, gradually cooled and cut to the desired length.

The effects of the components of the glass compositions of the invention will be illustrated.

The $SiO_2$ content is in the range of 45-65 wt.% and when it is less than 45 wt.% or more than 65 wt.%, sometimes, vitrification may not result. The $ZrO_2$ component improves the alkali-resistance and water-resistance of the glass.

When the $ZrO_2$ content is less than 10 wt.%, the effect is not sufficient whereas when it is more than 20 wt.%, devitrification occurs easily. Accordingly, the $ZrO_2$ content is in the range of 10-20 wt.%. The $Cr_2O_3$ and $SnO_2$ components are effective for improving the alkali-resistance resulting from the $ZrO_2$ component. When the $Cr_2O_3$ and $SnO_2$ content is less than 0.5 wt.%, no effect is found, whereas when it is more than 5 wt.%, devitrification occurs easily. Accordingly, the $Cr_2O_3$ and $SnO_2$ content is respectively in the range of 0.5-5 wt.% and high alkali-resistance can be attained by combining it with 10-20 wt.% of $ZrO_2$.

It is especially preferable that the sum of the $Cr_2O_3$ and $SnO_2$ contents be from 1.5 to 5.5 wt.%.

The $SnO_2$ component is especially effective for improving the alkali-resistance effect of the $ZrO_2$ component.

Accordingly, it is preferable to add the $SnO_2$ component in the range of 0.5-5 wt.% because devitrification occurs easily when the $SnO_2$ content is more than 5 wt.%. It is preferable the amount of $SnO_2$ be greater than 1%.

The alkali-resistance can be improved by adding the $Cr_2O_3$ component in the range of 0.5-5 wt.%, though the glass composition is colored. The effect of the combination of $ZrO_2$, $Cr_2O_3$ and $SnO_2$, is optimum when the sum of contents of $ZrO_2 + SnO_2 + Cr_2O_3$ is in the range of 12-25 wt.%; from the viewpoints of alkali-resistance, water-resistance and devitrification.

The RO component imparts the effects of reducing the melt viscosity of glass composition and decreasing the devitrificating temperature. Typical the RO component is CaO. The RO component can also be ZnO, BaO, MgO or SrO. The RO content is in the range of 0-18 wt.%. When it is more than 18 wt.%, the alkali-resistance and water-resistance are disadvantageously deteriorated.

The RO content is preferably less than 15 wt.% from the viewpoint of alkali-resistance and water-resistance; and it is preferably more than 5 wt.% from the viewpoint of the reduction of viscosity and a decrease of the devitrificating temperature.

The $R'_2O$ component imparts the effect of reducing the melt viscosity of the glass composition so as to attain easy melting operation. The sum of $Li_2O$, $Na_2O$ and $K_2O$ is in the range of 0-18 wt.%.

When it is more than 18 wt.%, deterioration of the alkali-resistance and water-resistance are disadvantageously high.

When the total content is more than 5 wt.%, the fabricatability is improved and when it is less than 15 wt.%, the deterioration of alkali-resistance and water-resistance does not occur.

Among the $R'_2O$ components, content of $Li_2O$ or $K_2O$ should be in the range of 0-5 wt.%. When the $Li_2O$ content is more than 5 wt.%, devitrification occurs easily.

When the $K_2O$ content is more than 5 wt.%, the viscosity of the glass composition is disadvantageously increased.

It is especially preferable that from 0-3 wt.% of $Li_2O$, 5-15 wt.% of $Na_2O$ and 0-3 wt.% of $K_2O$ from the viewpoint of melting characteristics be present. The $SO_3$ content is in the range of 0.05-1 wt.%. When the $So_3$ component is combined with the above-mentioned components, the melting characteristics can be remarkably improved without deterioration of the alkali-resistance and water-resistance.

When the $SO_3$ content is less than 0.05 wt.%, the melting characteristics are not improved, whereas when it is more than 1wt.%, the degree of improvement is low and a relatively large amount of the $SO_3$-containing raw material is needed, whereby the $SO_x$ content in the exhuast gas is increased and a large desulfurizing apparatus having large capacity for exhaust gas treatment is needed or bubbles will remain in the glass composition.

The $SO_3$ content is preferably in a range of 0.05-1 wt.%. Gypsum or Glauber's salt (sodium sulfate) is added for said purpose. These effects could not be attained by using the other auxiliary melt agents or refining agents.

In the manufacture of glass fibers by using a platina alloy bushing, the productivity of the glass fibers can be improved because the platina alloy is not corroded. It is also possible for the composition to contain less than 3 wt.% of a refining agent such as $Sb_2O_3$, $As_2O_3$ or F, a minor component or an impurity.

It is preferable to provide the glass with a composition consisting essentially of $SiO_2$:45-65 wt.%
$ZrO_2$:10-20 wt.%
$Cr_2O_3$:0-5 wt.%
$SnO_2$:0.5-5 wt.%
RO:0-15 wt.%
$R'_2O$:5-18 wt.%
$SO_3$:0.05-1 wt.%.

wherein the sum of contents of $ZrO_2 + SnO_2 + Cr_2O_3$ is 12-25 wt.%; RO is selected from the group consisting of CaO, MgO, ZnO, BaO and SrO; and $R'_2O$ is selected from the group consisting of 0-5 wt.% of $K_2O$, 5-18 wt.% of $Na_2O$ and 0-5 wt.% of $Li_2O$.

It is especially preferable to provide the glass with a composition consisting essentially of $SiO_2$:45-65 wt.%
$ZrO_2$:10-20 wt.%
$Cr_2O_3$:0.5-5 wt.%
$SnO_2$:0.5-5 wt.%
RO:5-15 wt.%
$R'_2O$:5-15 wt.%
$SO_3$:0.05-1 wt.%.

wherein the sum of contents of $ZrO_2 + SnO_2 + Cr_2O_3$ is 12-25 wt.%; RO is selected from the group consisting of CaO, MgO, ZnO, BaO and SrO and $R'_2O$ is selected from the group consisting of 0-3 wt.% of $K_2O$, 5-15 wt.% of $Na_2O$ and 0-3 wt.% of $Li_2O$.

Each of the following samples is prepared by using as the components of the glass compositions those which are passed through a Tyler 120 mesh sieve and melting about 680 g of total components at 1500° C in a platinum crucible. The time required for disappearing unmolten component (total melting time) and the time required for disapperance of bubbles (bubble disappearing time) are measured.

The molten glass is taken up to form a glass rod having a diameter of 5 mm and the glass rod is cut in a length of 50 mm to prepare the sample. The alkali-resistance is measured by preparing 2N-NaOH aq. solution at 95° C and dipping each sample in the solution for 4 hours, washing with water, drying it and weighing the sample to determine the weight loss.

The water-resistance is measured by Japanese Industrial Standard R 3502.

The compositions of samples and the test results are shown in Tables 1, 2 and 3.

Table 1

| Sample | No. 1 | No. 2 | No. 3 | No. 4 |
|---|---|---|---|---|
| $SiO_2$ | 49.0 | 49.5 | 49.9 | 49.9 |
| $ZrO_2$ | 19.0 | 19.0 | 19.0 | 19.0 |
| $SnO_2$ | 4.5 | 4.5 | 4.5 | 4.5 |
| CaO | 12.5 | 12.5 | 12.5 | 12.6 |
| $Na_2O$ | 14.2 | 14.1 | 14.0 | 14.0 |
| $SO_3$ | 0.8 | 0.4 | 0.1 | 0 |
| $10^{2.3}$ poise (°C) melting temperature | 1240 | 1243 | 1238 | 1243 |
| Alkali-resistance (mg/dm²) | 9 | 10 | 9 | 9 |
| Water-resistance ($Na_2O$ mg) | 0.27 | 0.27 | 0.28 | 0.26 |
| Total melting time hr | <1 | <1 | <1 | 2< |
| Bubble disappearing time (hr) | <2 | <2 | <2 | 3< |

Table 2

| Sample | No. 5 | No. 6 | No. 7 | No. 8 | No. 9 | No. 10 |
|---|---|---|---|---|---|---|
| $SiO_2$ | 59 | 58 | 58 | 53 | 73 | 57 |
| $ZrO_2$ | 15 | 14 | 15 | 20 | 2 | |
| $SnO_2$ | 5 | 1 | 2 | | | |
| CaO | 15 | | | 12 | 7 | 21 |
| MgO | | 6 | | | 4 | |
| ZnO | | 4 | | | | |
| BaO | | | 5 | | | |
| SrO | | | 5 | | | |
| $Na_2O$ | 5.5 | 14 | 14.9 | 15 | 14 | 1 |
| $K_2O$ | | 2 | | | | |
| $Li_2O$ | | 0.5 | | | | |
| $Al_2O$ | | | | | | 14 |
| $B_2O_3$ | | | | | | 7 |
| $SO_3$ | 0.5 | 0.5 | 0.1 | | | |
| $10^{2.3}$ poise melting temperature (°C) | 1248 | 1237 | 1239 | 1250 | 1335 | 1300 |
| Alkali-resistance (mg/dm²) | 10 | 15 | 13 | 11 | 45 | 107 |
| Water-resistance ($Na_2O$ mg) | 0.22 | 0.35 | 0.30 | 0.29 | 0.45 | 0.12 |
| Total melting time (hr) | * | 1< | * | 2< | * | * |
| Bubble disappearing time (hr) | * | 2< | * | 3< | * | * |

*No measurement

Table 3

| Sample | No. 11 | No. 12 | No. 13 | No. 14 | No. 15 | No. 16 | No. 17 | No. 18 |
|---|---|---|---|---|---|---|---|---|
| $SiO_2$ | 58 | 53 | 48 | 48 | 59 | 72.5 | 71 | 69.5 |
| $ZrO_2$ | 10 | 15 | 15 | 20 | 12 | | | |
| $SnO_2$ | 2 | 2 | 5 | | 2 | | | |
| $Cr_2O_3$ | 3 | 3 | 3 | 3 | 1.5 | | 1.5 | 3 |
| CaO | 11.5 | 15 | 13 | 8 | 10 | 12 | 12 | 12 |
| MgO | | | 4 | | | | | |
| ZnO | | | | 4 | | | | |
| BaO | | | | 3 | | | | |
| SrO | | | | | 5 | | | |
| $Na_2O$ | 15 | 11.5 | 11.2 | 12 | 7 | | | |
| $K_2O$ | | | | 0.7 | | 15 | 15 | 15 |
| $Li_2O$ | | | | 0.3 | 3 | | | |
| $SO_3$ | 0.5 | 0.5 | 0.8 | 1 | 0.5 | 0.5 | 0.5 | 0.5 |
| Alkali-resistance (mg/dm²) | 17 | 9 | 10 | 10 | 15 | 45 | 35.4 | 30 |
| Water-resistance ($Na_2O$ mg) | 0.33 | 0.30 | 0.26 | 0.27 | 0.31 | 1.06 | 1.00 | 0.88 |

Samples No. 1 to No. 4 had high alkali-resistances; high water-resistances and substantially the same melting temperatures for $10^{2.5}$ poise. However, samples No. 1 to No. 3 which contained the $SO_3$ component, have remarkably shorter total melting time and bubble disappearing time in comparison with those of the sample No. 4 which did not include the $SO_3$ component.

All components melted within 1 hour and the bubbles disappeared within 2 hours in samples No. 1 to No. 3. On the other hand, it takes more than 2 hours for melting all components and more than 3 hours for disappearing bubbles in sample No. 4.

Sample No. 5 is one example of a glass composition having high alkali-resistance and high water-resistance.

Samples No. 6 and No. 7 are examples of glass composition which can be melted at a relatively low temperature.

Sample No. 8 is a comparsion glass composition which includes neither $SnO_2$ nor $SO_3$. Although the alkali-resistance and water-resistance are relatively high, the liquidus temperature is also relatively high and the total melting time is too long.

Sample No. 9 is a high silica-low zirconia glass composition, as for comparison. The alkali-resistance and the water-resistance are relatively inferior and the melting temperature is relatively high in comparison with those of the glass compositions of the invention.

Sample No. 10 is one exmple of alumina borosilicate glass composition which does not include zirconia. The alkali-resistance is inferior and the melting temperature is high.

Samples No. 11 to No. 15 are examples of glass compositions of the invention.

Samples No. 12 to No. 14 having high zirconia content have especially high alkali-resistance and high water-resistance.

On the contrary, samples No. 11 and No. 15 have excellent melting characteristics though the alkali-resistance and the water-resistance are slightly lower than those of the samples No. 12 to No. 14 which have high zirconia content.

Samples No. 16 to No. 18 are comparisons of high silica glass compositions which do not include the zirconia component, wherein the $Cr_2O_3$ content is varied.

The alkali-resistance and the water-resistance increase depending upon increase of the $Cr_2O_3$ content, but they are not satisfactory because the zirconia component is not present.

The glass compositions which do not contain the $SO_3$ component have similar alkali-resistance and water-resistance but have inferior melting characteristics, whereby the total melting time is too long and the bubble disappearing time is also too long. Accordingly, the glass compositions which have a $SO_3$ content of 0.05–1 wt.% are especially preferable.

The glass compositions of the invention have excellent melting characteristics and high alkali-resistance and water-resistance and are suitable for fabrication of glass fibers, rods and tubes by using a platina alloy bushing because no corrosion of the platina alloy occurs for a long time. The glass fiber reinforced cementitious products having excellent strength can be prepared by blending the glass fiber made of the composition of the invention with cement.

The glass fiber has excellent alkali resistance and water resistance whereby the high strength of the glass fiber can be maintained in cementitious product, especially Portland cement product, and other alkaline products, and a decrease of the strength of the glass fiber caused by an elution of alkali is not substantially found. The melting characteristics and the devitrification of the glass compositions are excellent and accordingly, it has excellent glass fiber forming properites.

The cementitious products are especially Portland cement products which comprise a main component of calcium silicate (tricalcium silicate and dicalcium silicate), and, if desired, an additional cement component such as alumina cement, calcium sulfate, calcium hydroxide, silica additive and slag with 0-250 wt.% of an aggregate such as sand and other filler except glass fiber per said main component.

The E-glass which is non-alkali glass has been substantially used for preparing glass fiber filaments. The E-glass has high water resistance and excellent fabricatability by melt-spinning, however it is easily corroded which decreases the strength. On the contrary, the glass fiber made of the composition of the invention can maintain its high strengh for a long time.

The molten glass composition No. 12 in Table 3 is extruded through a platinum alloy bushing having 200 holes to form fibrous material and the fibrous material is drawn and taken up to obtain glass fiber. The glass fiber is cut to a length of 37 mm.

A cementitious slurry is prepared by mixing 67 wt. parts of Portland cement with 33 wt. parts of sand and further mixing with water at a ratio of 30 wt.% of water per the cement.

The cementitious slurry is sprayed through a mortar gun and the glass fiber is fed into the fluid of the cementitious slurry at a ratio of 5 wt.% per the cementitious solid components to obtain the glass fiber reinforced cementitious plate which maintains high strength for a long time.

It is usual to blend the glass fiber at a ratio of 0.5 to 30 wt.% preferably 1 to 20 wt.% to the cementitious product. The length of the glass fiber blended in the cementitious product is in a range of 1-200 mm preferably 5-100 mm.

The cementitious products include the Portland cement component. It is also possible to include the other additives such as aggregate resin, bituman and other additives.

The light Portland cement product which is reinforced with the glass fiber and is foamed by a foaming agent is one of products for which the glass composition of the invention is applied. The reinforcing effect of the glass fiber can be maintained for a long period because of high alkali-resistance and water-resistance.

We claim:

1. A glass composition consisting of $SiO_2$:45-65 wt.%
$ZrO_2$:10-20 wt.%
$Cr_2O_3$:0-5 wt.%
$SnO_2$:0-5 wt.%
RO:0-18 wt.%
$R'_2O$:0-18 wt.%
$SO_3$:0.05-1 wt.% and less than 3 wt.% of a refining agent or impurities, wherein the sum of contents of $Cr_2O_3$ + $SnO_2$ is 0.5-10 wt.% and the sum of contents of $ZrO_2$ + $SnO_2$ + $Cr_2O_3$ is 12-25 wt.% and RO is selected from the group consisting of CaO, MgO, ZnO, BaO and SrO; and $R'_2O$ is selected from the group consisting of $K_2O$ of 0-5 wt.%, $Na_2O$ of 0-18 wt.% and $Li_2O$ of 0-5 wt.%.

2. A glass composition consisting $SiO_2$:45-65 wt.%
$ZrO_2$:10-20 wt.%
$Cr_2O_3$:0-5 wt.%
$SnO_2$:0.5-5 wt.%
RO:0-15 wt.%
$R'_2O$:5-18 wt.%
$SO_3$:0.05-1 wt.% and less than 3 wt.% of a refining agent or impurities, wherein the sum of contents of $ZrO_2$ + $SnO_2$ + $Cr_2O_3$ is 12-25 wt.%; RO is selected from the group consisting of CaO, MgO, ZnO, BaO and SrO and $R'_2O$ is selected from the group consisting of $K_2O$ of 0-5 wt.%, $Na_2O$ of 5-18 wt.% and $Li_2O$ of 0-5 wt.%.

3. A glass composition consisting of $SiO_2$:45-65 wt.%
$ZrO_2$:10-20 wt.%
$Cr_2O_3$:0.5-5 wt.%
$SnO_2$:0.5-5 wt.%
RO:5-15 wt.%
$R'_2O$:5-.15 wt.%
$SO_3$:0.05 - 1 wt.% and less than 3 wt.% of a refining agent or impurities, wherein the sum of contents of $ZrO_2$ + $SnO_2$ + $Cr_2O_3$ is 12 - 25 wt.%, RO is selected from the group consisting of CaO, MgO, ZnO, BaO and SrO and $R'_2O$ is selected from the group consisting of $K_2O$ of 0-3 wt.%, $Na_2O$ of 5-15 wt.% and $Li_2O$ of 0 - 3 wt.%.

4. A glass fiber made of the glass composition of claim 1.

5. A glass fiber made of the glass composition of claim 3.

6. In a cement product comprising a Portland cement and a glass fiber, the improvement which comprises the glass fiber of claim 4.

* * * * *